Feb. 18, 1936. J. H. STUMPF 2,031,341
PISTON RING
Filed Aug. 18, 1931
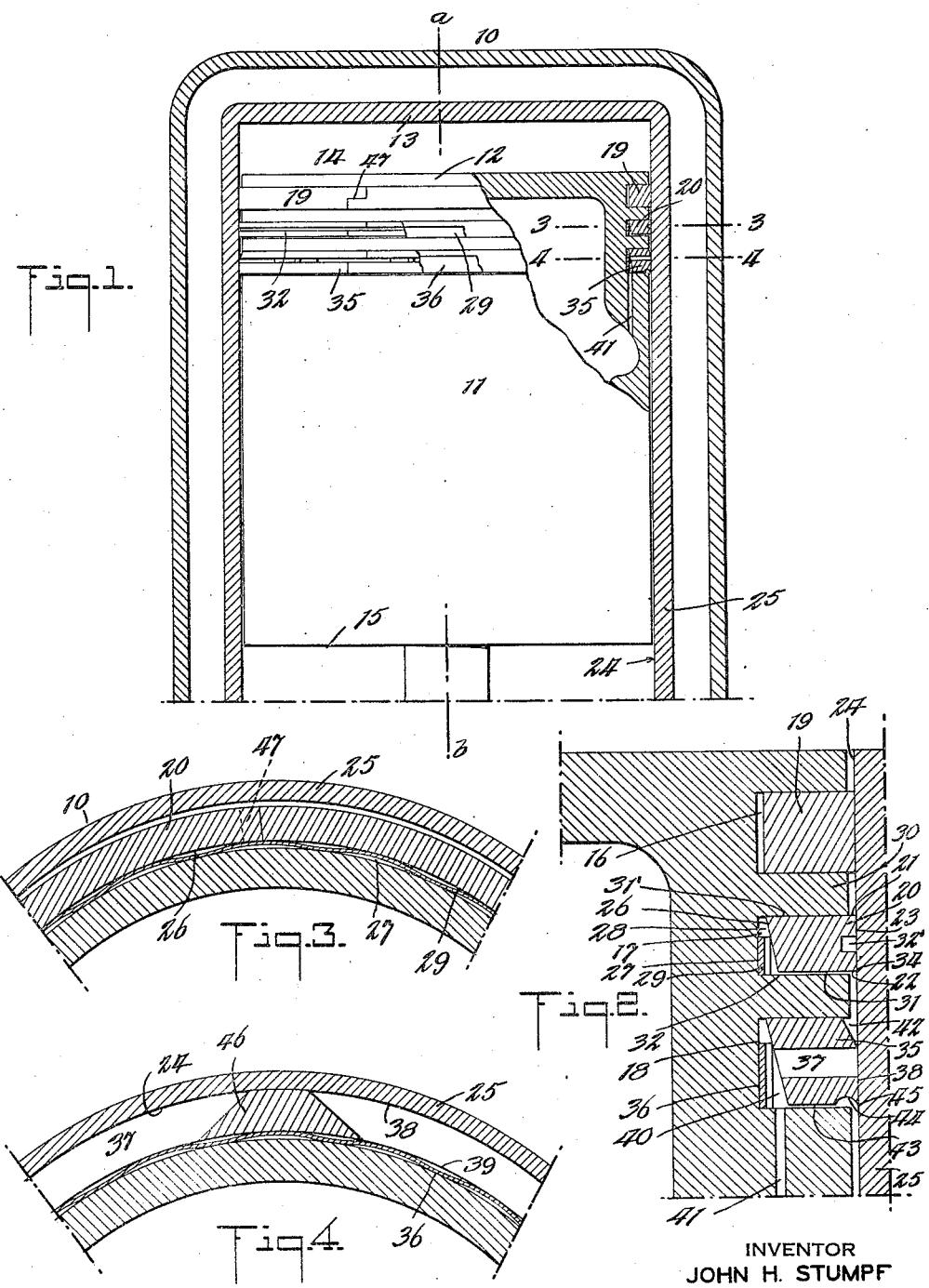
INVENTOR
JOHN H. STUMPF
BY
Warren S. Orton
ATTORNEY Patented Feb. 18, 1936

2,031,341

UNITED STATES PATENT OFFICE 2,031,341

PISTON RING

John H. Stumpf, West Forrest Hills, N. Y., assignor to Wilkening Manufacturing Company, Philadelphia, Pa., a corporation of Delaware Application August 18, 1931, Serial No. 557,759

1 Claim. (Cl. 309—45)

The invention relates in general to an internal combustion engine cylinder and associated piston with piston rings, and the invention specifically relates to an improvement in piston rings for sealing the joint between the sliding piston and the wall of the associated cylinder.

The primary object of the invention is to provide a simplified form of sealing ring and associated containing groove, organized for controlling the piston against the usual piston slaps, which will act efficiently to hold the compression and explosion in the explosion chamber of the associated cylinder and which will tend to prevent seepage of oil from the crank case past the piston as the piston is reciprocated in the cylinder and which will act automatically to return any oil seepage back into the crank case.

The invention herein disclosed particularly features an organization of piston rings designed and organized to shift the piston ring, not only in its conventional radial expanding movement into engagement with the cylinder wall but also bodily in an axial direction towards the head end of the piston in order to seal the joint between one side face of the ring and the adjacent wall defining one side of the groove in which the ring is contained.

Still another object of the invention is to provide a piston ring construction of the type outlined which will act in its reciprocatory movement of the piston not only to prevent seepage of oil on the cylinder wall from passing the piston but which will act additionally to scrape the film of oil from the cylinder wall and return it to the crank casing or other receptacle disposed to receive such oil drip scraped from the cylinder walls.

Various other objects and advantages of the invention will be in part obvious from an inspection of the accompanying drawing and in part will be more fully set forth in the following particular description of one form of mechanism embodying the invention, and the invention also consists in certain new and novel features of construction and combination of parts hereinafter set forth and claimed.

In the accompanying drawing:

Fig. 1 is a view in axial section of the upper portion of an internal combustion engine equipped with a preferred embodiment of the invention and with parts of the piston broken away to show parts in axial cross section;

Fig. 2 is an enlarged detail view of the upper right hand portion of the parts shown in Fig. 1;

Figs. 3 and 4 are each horizontal sectional views taken respectively on the planes indicated by the lines 3—3 and 4—4 of Fig. 1 and showing a small arc section of the entire ring.

Particularly referring to the showing in Fig. 1, there is disclosed an internal combustion engine cylinder 10 in which is slidably mounted a piston 11 forming between a head 12 thereof and the top 13 of the cylinder an explosive chamber 14. In order to show the adaptability of the invention to a conventional form of internal combustion of the type used in automotive vehicles, it will be understood that the showing as thus far described is of such conventional form and that the piston is of the hollow type with its skirt end 15 facing the lower open end of the cylinder 10 which in turn is exposed to the crank case with its usual content of lubricating oil. Still following conventional structures, the piston is provided with three vertically and axially spaced apart grooves numbered successively from the head 12 as an upper groove 16, an intermediate groove 17 and a lower groove 18 and which grooves are of the conventional form rectangular in cross section. The upper groove 16 is provided with a piston ring 19 which may be of the form of the other rings hereinafter described, but which in this showing is intended simply to be a conventional form of split ring.

The intermediate groove 17 has mounted therein a single split piston ring 20 somewhat resembling conventional forms of such rings in that it is somewhat rectangular in cross section and has a flat upper side 21 and a similar flat lower side 22, the sides 21 and 22 extending parallel to each other and perpendicularly to the outer face 23 which engages the inner face 24 of the cylinder wall 25. The ring 20 distinguishes from conventional similar structures in that its inner periphery 26 is beveled downwardly and outwardly at an angle to the axis of the cylinder and piston indicated by the line a—b in Fig. 1 and at an angle to the rear wall 27 defining the inner side of groove 17. Positioned in the wedging space 28 formed by the sides 26 and 27 is positioned a corrugated piston ring expander 29.

This ring is a piece of flat steel corrugated or waved as particularly shown in Fig. 3 and designed to act on ring 20 in its tendency to expand, to distend or at least help in distending the ring 20 in a radial direction, to maintain the ring 20 in firm resilient engagement with the inner face 24 of the cylinder wall 25. The expander 29 also acts in its engagement with the inclined or beveled surface 26 to shift the ring 20 bodily upwardly in the showing in Fig. 2 and into engagement with the land 30 between the grooves 16 and 17. This has a tendency to shift the lower edge 22 away from the bottom face 32 of the groove 17 but it is understood that this showing of a gap in Fig. 2 has been exaggerated and that it is the intent to have ring 20 substantially fit in the groove 17 with a sliding fit and without any material freedom of axial play, the ring being simply urged upwardly to insure the closing of the joint at 31'. The outer periphery of ring 20 is provided with an oil groove 32' but otherwise the peripheral face of the ring 20 engages snugly against the inner face 24 of the cylinder for its entire thickness measured from top to bottom in the showing in Fig. 2. This arrangement provides a relatively long extent of contact between ring 20 and the surface 24 which coacts with the ring 19 to insure a seal connection to prevent loss of compression or explosive force in the explosive chamber 14. This squared engagement with the inner face of the cylinder also acts to scrape any oil film from the cylinder wall for as the piston moves downwardly the lower edge 34 acts in effect as a scraping edge.

Positioned in the lower groove 18 is an oil ring 35 which corresponds in structure and operation to the ring 20 hereinbefore described and is similarly acted upon by a corrugated ring expander 36. This ring 35 distinguishes from ring 20 in several aspects; it being noted for instance that instead of the shallow oil groove 32' it is provided with an oil passage 37 which extends therethrough from its outer periphery 38 to its inner beveled periphery 39 and opens at its rear or inner end into the clearance space 40 from which oil is permitted to leak through the oil drain vent 41 which extends from the groove 18 downwardly to discharge into the crank casing. The upper portion of the outer periphery of ring 35 is beveled upwardly from the oil passage to provide an upwardly facing oil trough 42 which discharges at its lower edge into the passageway 37.

The bottom face 43 of ring 35 is provided adjacent the outer periphery 38 with an undercut oil groove 44 which coacts with the periphery 38 to form a downwardly facing knife edge 45 which scrapes along the inner face 24 of the cylinder. This arrangement of oil grooves, passages and scraping edges acts as the piston moves upwardly to trap oil into the trough 42 from which it drains into the oil passage 37 and discharges at its inner end through clearance 40 and vent 41. As the piston moves downwardly the knife edge 45 in its scraping engagement with the wall of the cylinder acts to scrape therefrom any oil film or other accumulation of oil forcing the same into the groove 44 from which it leaks under the ring 35 into the oil vent 41, or it may be considered that the knife edge simply scrapes the oil downwardly along the cylinder wall returning it directly to the crank case. It is understood that the oil passage 37 is formed of a plurality of passages spaced apart circumferentially of the groove and are separated by beveled end connecting pieces 46. The ends of each of the rings are cut away to form overlapping joints as shown at 47.

In operation it is understood that the rings are mounted in their respective grooves following conventional practices in this respect, the split expanders being disposed first in the groove after which the expandable piston rings are inserted, temporarily retracted into position to permit the piston to be inserted in the cylinder, after which the resiliency of the rings will force them into engagement with the cylinder wall assisted by the resiliency of the expander as is well known in such constructions. The tendency of the expander to move outwardly reacts on the beveled face to shift the rings in a direction at right angles to their planes and into engagement with the lands of the rings next above the ring as previously described.

I claim:

The combination with a piston adapted to be mounted for up and down reciprocation in a cylinder, said piston having a ring groove therein, of a ring in said groove having an undercut oil groove in its bottom face, said groove forming an edge of less than 90 degrees for scraping oil from the cylinder surface during the down stroke of the piston, said ring having its face on the side farther from the cylinder engaging surface sloping downwardly and outwardly, and a ribbon expander disposed in said groove behind the said ring for contacting the upper portion of said sloping face to force said ring outwardly and upwardly in the groove, the lower edge of said expander being radially spaced from said ring, and said piston having drain passages therein opening into the space between the expander and the ring for carrying off oil from the groove and arranged to drain the bottom of the groove.

JOHN H. STUMPF.